(12) United States Patent
Ito et al.

(10) Patent No.: US 6,706,370 B1
(45) Date of Patent: Mar. 16, 2004

(54) SUNSHADE OF A SUNROOF FOR A MOTOR VEHICLE AND MANUFACTURING METHOD THEREOF

(75) Inventors: Tatsuro Ito, Kasugai (JP); Shogo Okado, Kasugai (JP); Kazuo Sugiura, Kasugai (JP); Takashi Mihara, Kasugai (JP); Fumihiro Funahashi, Kasugai (JP)

(73) Assignee: Howa Textile Industry Co., Ltd., Kasugai (JP)

( * ) Notice: Subject to any disclaimer, the term of this patent is extended or adjusted under 35 U.S.C. 154(b) by 0 days.

(21) Appl. No.: 10/300,732

(22) Filed: Nov. 19, 2002

(51) Int. Cl.[7] .............................. B32B 1/00; B60J 3/00; B28B 5/00; B29C 65/00
(52) U.S. Cl. ..................... 428/174; 428/99; 428/172; 428/192; 428/318.4; 296/97.6; 296/97.7; 264/241; 264/257; 264/325; 264/511; 160/370.21; 156/213; 156/285; 156/300
(58) Field of Search ................. 160/370.21, 370.23; 296/39.1, 97.6, 77.7, 95.1, 136; 428/99, 172, 174, 192, 318.4; 156/196, 213, 285, 300; 264/241, 257, 325, 511, 546

(56) References Cited

U.S. PATENT DOCUMENTS

| | | | | |
|---|---|---|---|---|
| 4,202,396 A | * | 5/1980 | Levy | 160/107 |
| 5,267,599 A | * | 12/1993 | Kim | 160/370.21 |
| 5,615,923 A | * | 4/1997 | Madison | 296/95.1 |
| 6,289,968 B1 | * | 9/2001 | Karten et al. | 160/370.23 |

FOREIGN PATENT DOCUMENTS

| | | |
|---|---|---|
| JP | 07-045133 | 5/1995 |
| JP | 2000-255270 | 9/2000 |

* cited by examiner

Primary Examiner—Donald J. Loney
(74) Attorney, Agent, or Firm—Hogan & Hartson, LLP

(57) ABSTRACT

A sunshade of a sunroof for a motor vehicle includes superposing resin impregnated glass fiber mat layers (2,3) on both surfaces of a semi-rigid layer (1) made of an urethane foam and having a uniform thickness, superposing a skin material layer (5) on a surface of one of the resin impregnated glass fiber mat layers (2) via an adhesive film layer (4), superposing a back material layer (7) on the surface of the other resin impregnated glass fiber mat layer (3) via an adhesive film layer (6), and fusion bonding the layers by clamping the layers (8) by a press mold (9, 10) and heating and pressurizing the layers (8) so as to form a predetermined three-dimensional shape.

20 Claims, 7 Drawing Sheets

SUNSHADE OF A SUNROOF FOR A MOTOR VEHICLE AND MANUFACTURING METHOD THEREOF

BACKGROUND OF THE INVENTION

1. Technical Field

The present invention relates to a sunshade which is slidably provided in a sunroof of a motor vehicle, and a manufacturing method thereof.

2. Prior Art

A sunshade (a sun visor) provided in a sunroof (a top light) of the motor vehicle has been conventionally supported so as to freely slide in a longitudinal direction by slidably, loosely fitting both side edges to guide rails having a C-shaped transverse section provided in both side edge top portions of an opening in a ceiling panel.

3. Drawbacks Accompanying the Prior Art

In this case, the conventional sunshade is constructed by employing a metal plate such as made from aluminum or the like, a synthetic resin plate having a rigidity corresponding to the metal plate, a laminated plate or the like as a base plate, and sticking a skin such as a fabric or the like onto an indoor surface of the base plate. However, since in production of the conventional sunshade there exists the problem to achieve sufficient strength against deforming of the sunshade during use, since high rigidity and the like of the sunshade are required to avoid deforming, it is hard to achieve weight and cost savings in case of producing the conventional sunshade.

SUMMARY OF THE INVENTION

Problem to be Solved by the Invention

The present invention is made by taking the above matters into consideration, and an advantage of the present invention is to achieve weight and cost savings as well as a high quality of a sunshade.

Means for Solving the Problem

In order to achieve the advantage, according to the present invention, there is provided a method of manufacturing a sunshade of a sunroof for a motor vehicle characterized by the steps of superposing resin impregnated glass fiber mats on both surfaces of a semi-rigid layer made of an urethane foam and having a uniform thickness; superposing a skin material such as a fabric or the like on a surface of one resin impregnated glass fiber mat; superposing a back material such as a non woven fabric or the like on another resin impregnated glass fiber mat; and fusion bonding the respective layers by clamping the multi-layered body by a press mold and heating and pressuring the multi-layered body so as to form in a predetermined three-dimensional shape.

Further, according to the present invention, there is provided a method of manufacturing a sunshade of a sunroof for a motor vehicle as described above, characterized by providing a split mold laterally sliding with the press mold, and fusion bonding by involving the skin forming a front edge of the sunshade in a back side by the split mold.

Further, according to the present invention, there is provided a method of manufacturing a sunshade of a sunroof for a motor vehicle as described above, characterized by making the compressibility applied to both side edges of the sunshade by the press mold high, and forming a support portion expanding and protruding up to the skin material side and the back material side in a part of both side edges by making the compressibility applied to said side edges low.

Further, according to the present invention, there is provided a sunshade of a sunroof for a motor vehicle characterized in that resin impregnated glass fiber mats are fusion bonded on both surfaces of a semi-rigid layer made of an urethane foam and having a uniform thickness, a skin material such as a fabric or the like is fusion bonded on a surface of one resin impregnated glass fiber mat, a back material such as non woven fabric or the like is fusion bonded on another resin impregnated glass fiber mat, the front edge is pressurized with a high compressibility and fusion bonded by involving the skin material in a back side, a support portion, expanding and protruding to the skin material side and the back material side and arranged to be slidably in contact with an inner surface of a guide rail, is formed by pressurizing both side edges with high compressibility, while pressurizing a part of both side edges with low compressibility, and an engagement portion protruding upward in a curved shape is formed in a rear edge.

DETAILED DESCRIPTION OF THE INVENTION

Figure 1:
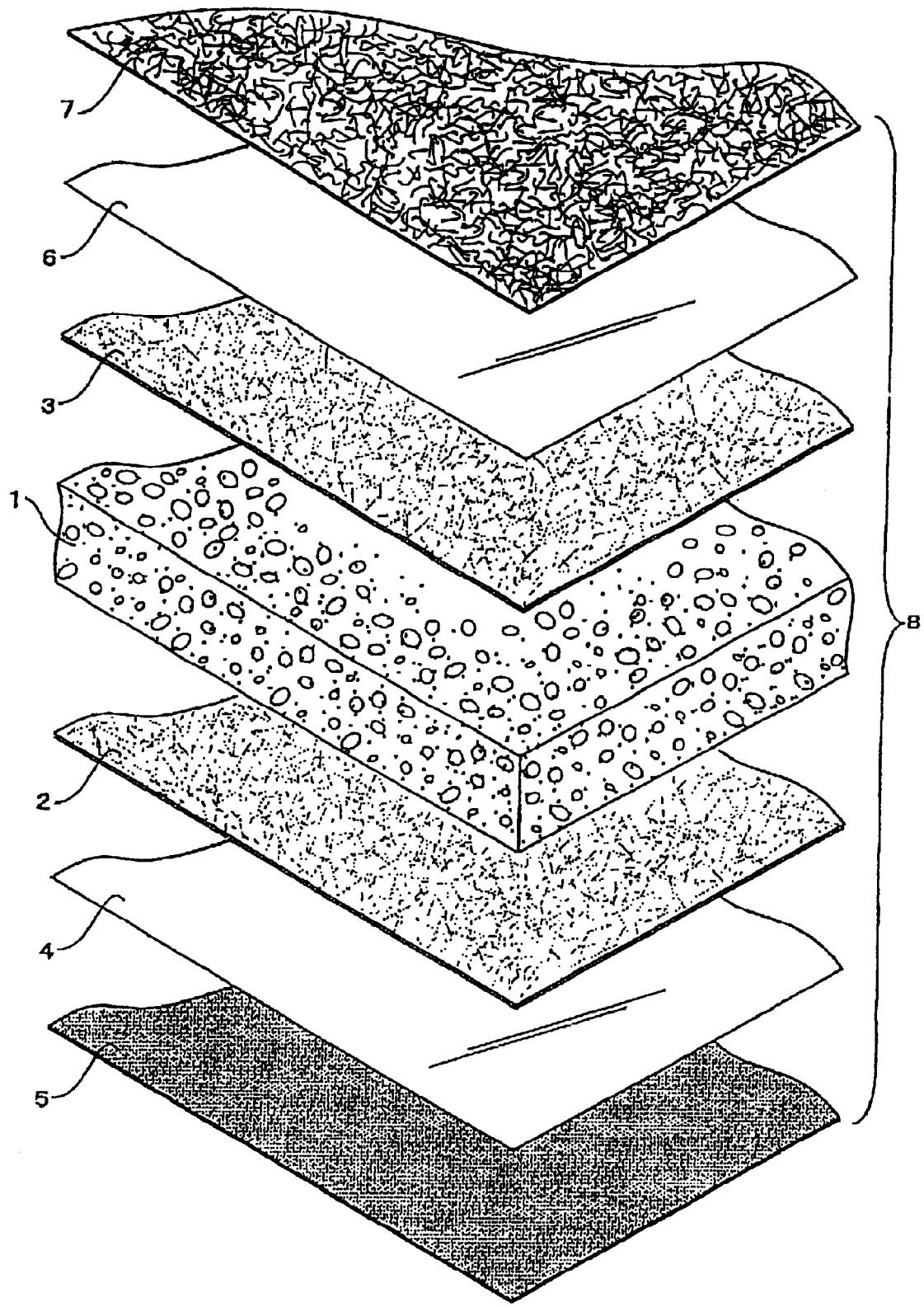
FIG. 1 is a perspective view of a plurality of superposed materials constituting a sunshade according to the present invention.
Figure 2:
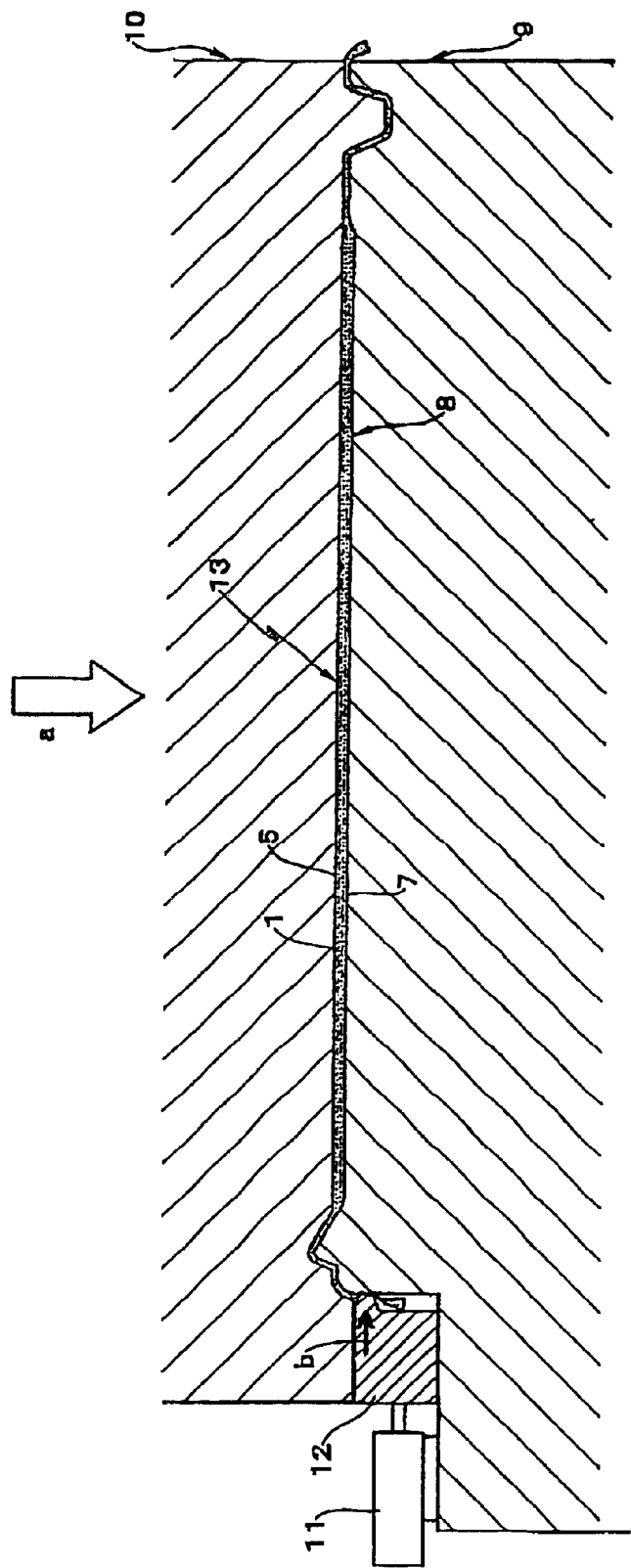
FIG. 2 is a schematic view of a heat and pressure press machine manufacturing the sunshade according to the present invention.

Next, a description will be given of an embodiment according to the present invention with reference to the accompanying drawings. FIG. 1 is a perspective view showing a plurality of superposed materials constituting a sunshade according to the present invention. Reference numeral 1 denotes a semi-rigid layer made of an urethane foam having density=0.020 to 0.045 and thickness=3 to 10 mm. Glass fiber mats 2 and 3 impregnated with a thermosetting resin such as an urethane or the like are, respectively, superposed on both surfaces of the semi-rigid layer, a skin material 5 made of a fabric (cloth fabric), a needle punch non woven fabric or a plastic foam laminate knit fabric or the like is superposed on a surface of one resin impregnated glass fiber mat 2 via an adhesive film 4, and a back material 7 such as a polyester non woven fabric, and a paper or the like is superposed on another resin impregnated glass fiber mat 3 via an adhesive film 6. Then, a multi-layered body 8 is set in press molds 9 and 10 of a heat and pressure press machine as shown in FIG. 2 in such a manner that the skin material 5 is set at the top side, is clamped, heated and pressurized. The press machine is structured such that one press mold 10 vertically moves so as to be opened and closed as shown by an arrow (a) according to an operation of a main cylinder, and a split mold 12 laterally sliding as shown by an arrow (b) according to an operation of a sub cylinder 11 is provided.

Figure 3:
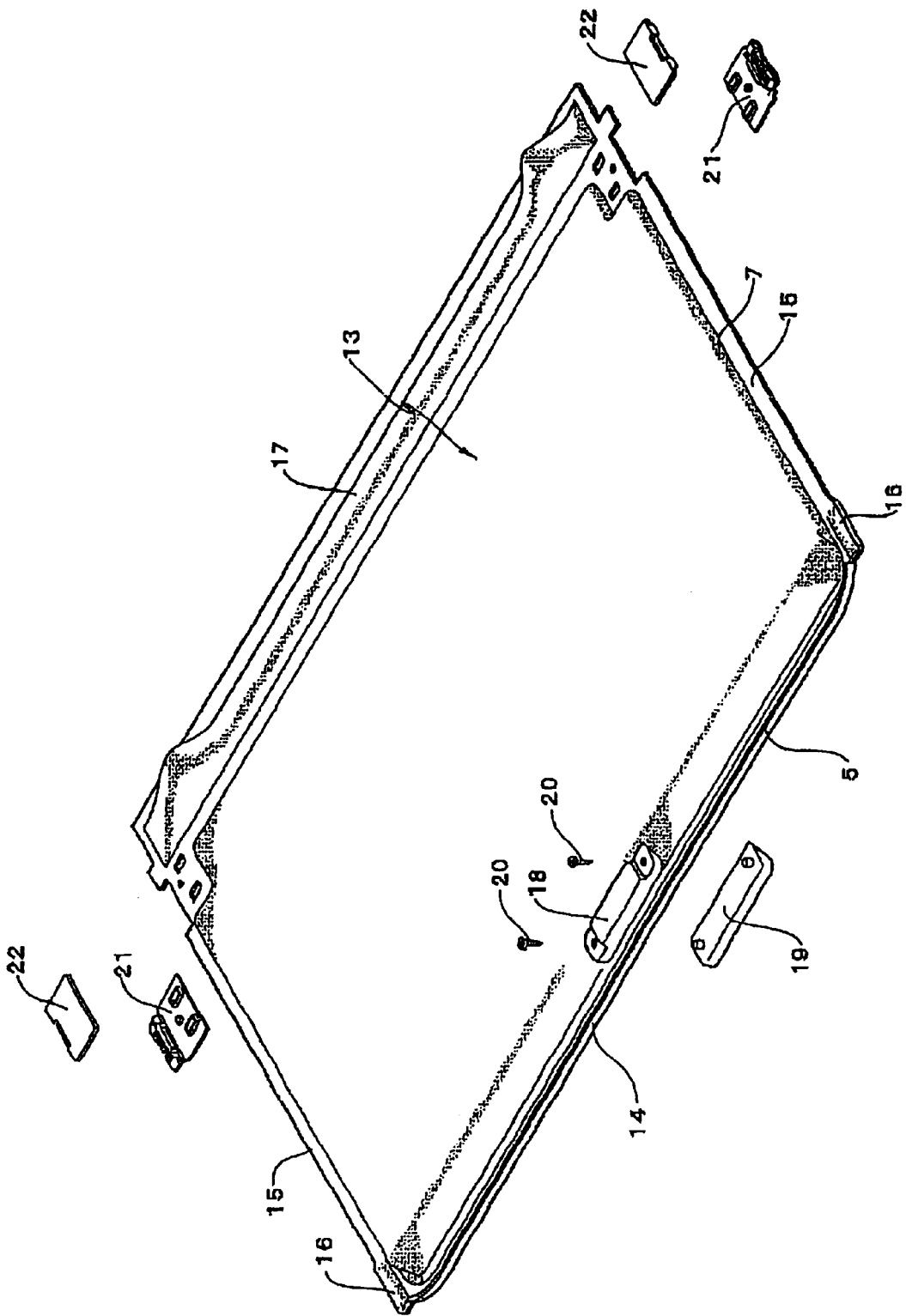
FIG. 3 is a perspective view showing an embodiment of the sunshade according to the present invention.
Figure 4:
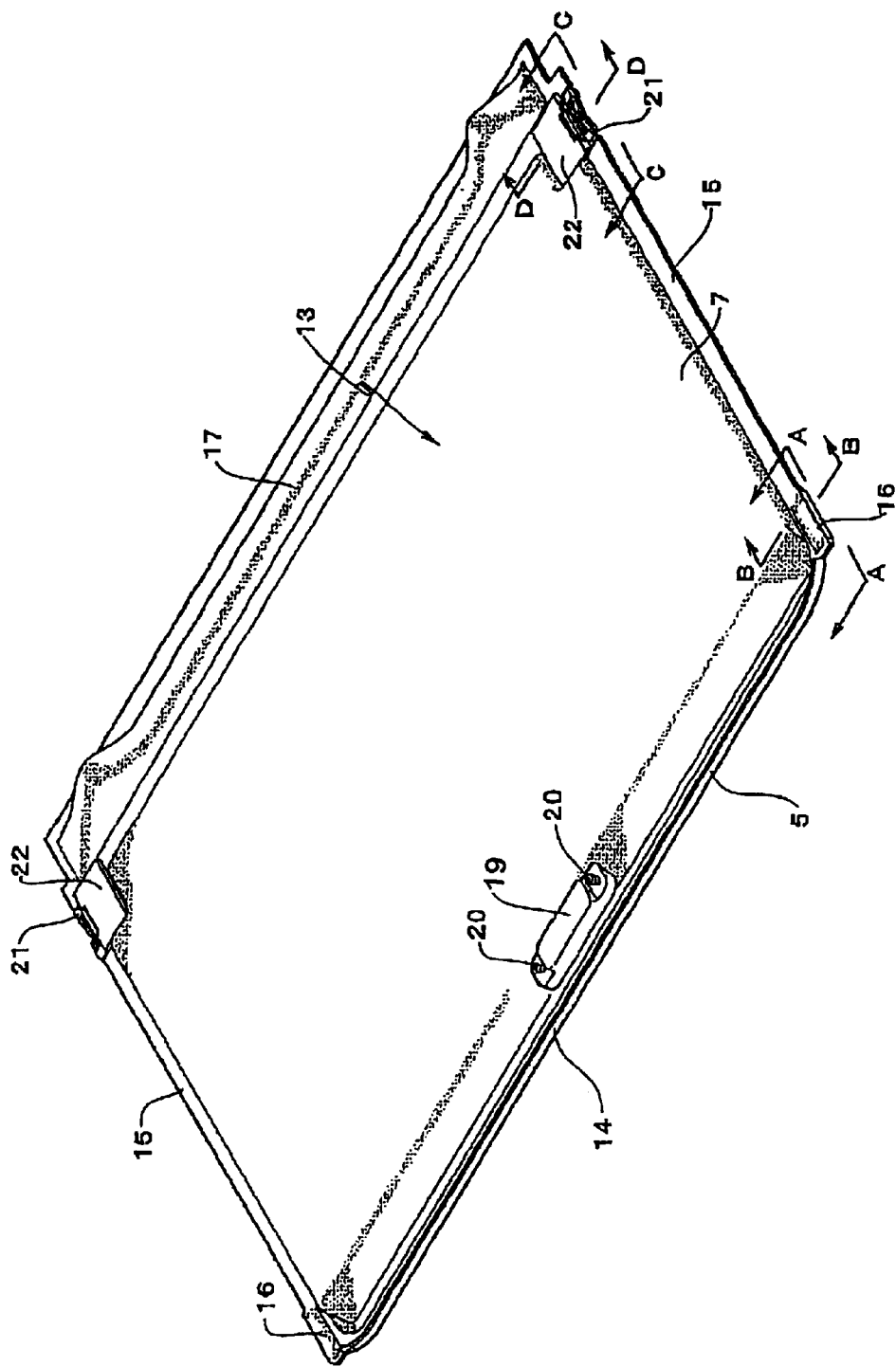
FIG. 4 is a perspective view showing an assembled state of the sunshade in FIG. 3.
Figure 5:
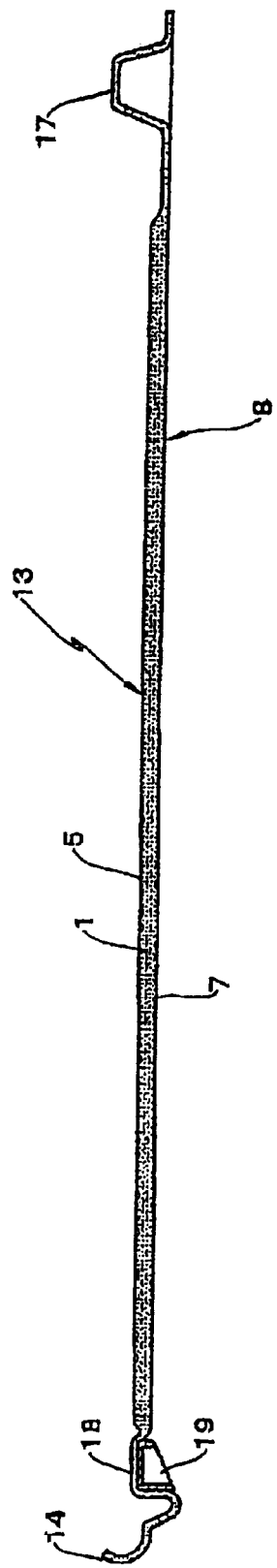
FIG. 5 is a vertical cross sectional view of the sunshade in FIG. 4.

Further, FIG. 3 is an outline perspective view showing a sunshade 13 which is formed in a three dimensional shape by heating and pressurizing and by trimming a periphery thereof as seen from an obliquely forward side of a top surface, FIG. 4 shows an assembled state of the sunshade, and FIG. 5 is a vertical cross sectional view thereof. A front edge 14 of the sunshade is made rigid by increasing the compressibility applied by the pressurizing force of the press molds 9 and 10, and is exposed to an edge treatment by moving the split mold 12 forward at a time of clamping the mold by involving the skin material 5 in the back side in the clamping process and is fusion bonded.

Figure 6:
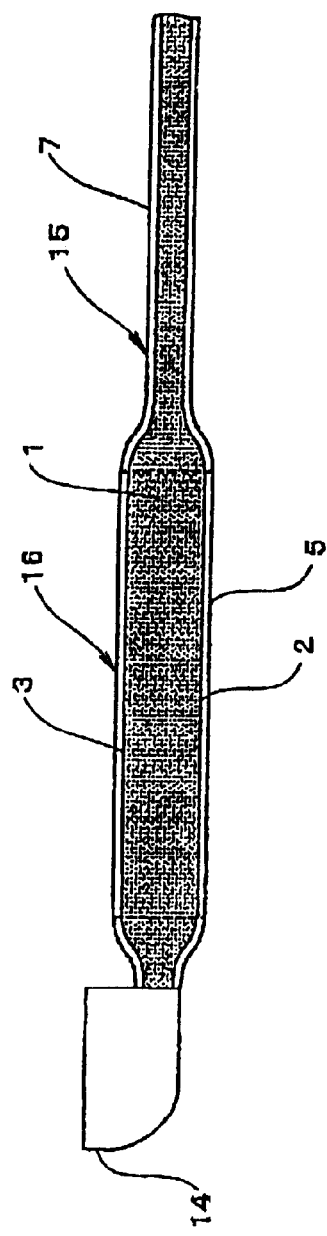
FIG. 6 is a view along a line A—A in FIG. 4.
Figure 7:
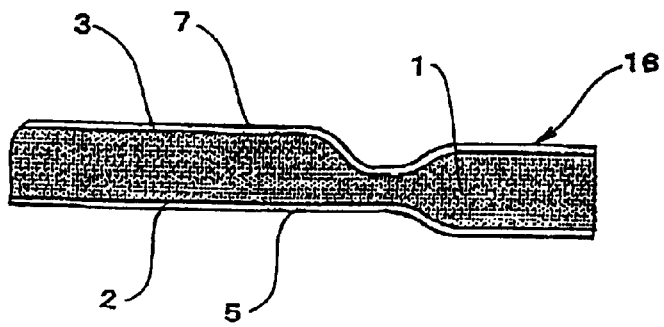
FIG. 7 is a view along a line B—B in FIG. 4.

Further, both side edges 15 of the sunshade 12 are structured such as to form support portions 16 expanding and protruding to the skin material side and the back material side and having a width, respectively, of about 1 to 3 mm by making the compressibility by the pressurizing force of the press mold high so as to be impose rigidity to said side edges 15 and making the compressibility close to the front edges of both side edges 15 low as shown in FIGS. 6 and 7. Said the support portions are brought into slidable contact with the inner surfaces of guide rails (not shown).

Further, as shown in FIG. 5 an engagement portion 17 is formed in a rear edge of the sunshade 13 by protruding the sunshade 13 to an upper side in a curved shape. The engagement portion is used for engaging the sunshade with a rain gutter (not shown) provided in the sunroof so that the sunshade moves rearward together with a movement of a sunroof (not shown) at a time of moving the sunroof rearward.

Figure 8:
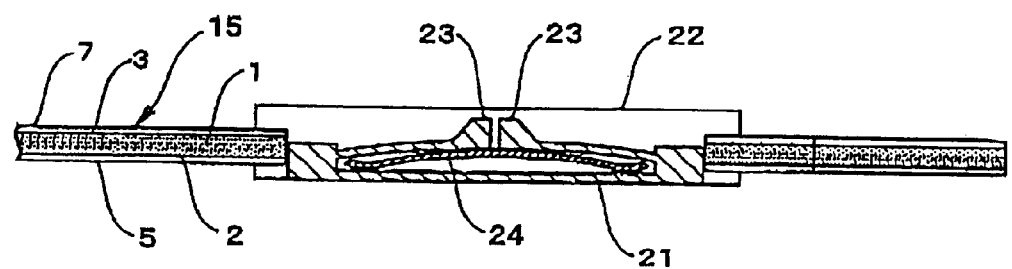
FIG. 8 is a view along a line C—C in FIG. 4.
Figure 9:
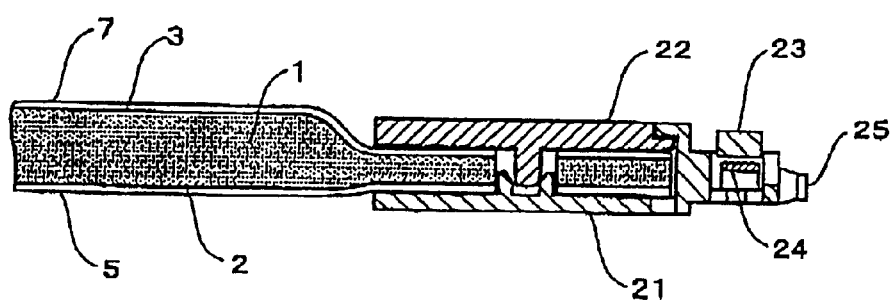
FIG. 9 is a view along a line D—D in FIG. 4.

In this case, reference numeral 18 denotes a handle mounting recess portion molded in a center of the front edge so that an indoor side (a lower surface side) is recessed. A plastic handle 19 is fastened to the handle mounting recess portion 18 by screws 20. Further, reference numeral 21 denotes slide shoes. The slide shoes 21 are fixed to both side edges 15 close to a rear edge by being clamped by means of mounting plates 22, and are brought into slidable contact with the inner surfaces of the guide rails together with the support portions 16. In the slide shoe, as shown in FIGS. 8 and 9, a pair of slidable contact pieces 23 are forced upward by a leaf spring 24, and the slidable contact pieces are elastically brought into contact with a top surface within the guide rail due to an elasticity of the leaf spring. Further, a pair of barbel-like elastic pieces 25 are protruded on outer side surfaces of the slide shoes, and the elastic pieces are elastically brought into contact with the inner side surfaces of the guide rail.

In the sunshade 13 manufactured in the manner mentioned above, since the glass fiber mats 2 and 3 are thermally fusion bonded to both surfaces of the semi-rigid layer 1 made of the urethane foam, the mats can form a firm core material having a reduced weight and a high rigidity. Further, since the front edge 14 is exposed to said edge treatment under high compressibility by the pressure of the press mold unto said front edge 14, it is possible to obtain a strength in the front edge to such extend that even other portions of the front edge in the vicinity of the handle 19 are not deformed, even when being pressed by hand at the time of the opening and closing operation of the shade, while due to the fact that the skin material 5 is also involved in said edge treatment, a beautiful outer appearance can be achieved without exposing the core material to the surface.

Since, on the one hand, both side edges 15 are made rigid and thin by applying over a main part thereof high compressibility by the press mold unto said sides edges 15, both side edges 15 can be floated from the inner surface of the guide rails. On the other hand, since said support portions 16 are formed in part of said side edges 15 by expanding and protruding to the skin material side and the back material side and having a comparatively larger width that the above mentioned thin part of said side edges 15 by the application of low compressibility by the press mold unto a portion of each of said side edges 15, said support portions 16 are arranged to be slidable in contact with the inner surface of the guide rail, so that a suitable sliding resistance can be always obtained at a time of the opening and closing operation of the shade.

Further, since the engagement portion 17 protruding upward in the curved shape is formed in the rear edge of the sunshade, and the whole periphery of the sunshade is surrounded by said engagement portion, the front edge 14 and both side edges 15, the whole strength and the rigidity of the sunshade are significantly high, even when being formed thin by using less material, while the shape keeping property is excellent.

Effects of the Invention

As described above, according to the present invention, in comparison with the conventional sunshade, in which a metal plate or the like is employed as the base plate, various useful effects can be obtained, such that a considerable weight saving can be achieved, a sunshade with excellent shape keeping property can be manufactured by the use of less material, whereby also the manufacturing cost can be reduced.

What is claimed is:

1. A method of manufacturing a sunshade of a sunroof for a motor vehicle comprising:

superposing resin impregnated glass fiber mat layers on both surfaces of a semi-rigid layer made of an urethane foam and having a uniform thickness;

superposing a skin material layer on a surface of one resin impregnated glass fiber mat layer;

superposing a back material layer on a surface of the other resin impregnated glass fiber mat layer; and fusion bonding the layers by clamping the layers by a press mold and heating and pressurizing the layers so as to form a predetermined three-dimensional shape.

2. The method of manufacturing a sunshade of a sunroof for a motor vehicle according to claim 1, further comprising providing a split mold laterally sliding with the press mold, and fusion bonding by involving the skin material layer forming a front edge of the sunshade in a back side by the split mold.

3. The method of manufacturing a sunshade of a sunroof for a motor vehicle according to claim 1, further comprising making a compressibility high in both side edges of the sunshade by the press mold, and forming a support portion expanding and protruding to the skin material layer and the back material layer in a part of both side edges by making the compressibility low.

4. A sunshade of a sunroof for a motor vehicle comprising:

resin impregnated glass fiber mat layers fusion bonded on both surfaces of a semi-rigid layer made of an urethane foam and having a uniform thickness;

a skin material layer fusion bonded on a surface of one of the resin impregnated glass fiber mat layers; and a back material layer fusion bonded on a surface of the other resin impregnated glass fiber mat layer, wherein the layers are fusion bonded by clamping the layers by a press mold and heating and pressurizing the layers so as to form a predetermined three-dimensional shape.

5. The sunshade of a sunroof for a motor vehicle according to claim 4, wherein the semi rigid layer has a density in the range of 0.020 to 0.045 mm.

6. The sunshade of a sunroof for a motor vehicle according to claim 4, wherein the semi rigid layer has a thickness in the range of 3 to 10 mm.

7. The sunshade of a sunroof for a motor vehicle according to claim 4, wherein the resin impregnated glass fiber mat layers are impregnated with a thermosetting resin.

8. The sunshade of a sunroof for a motor vehicle according to claim 4, wherein the skin material layer is a cloth fabric.

9. The sunshade of a sunroof for a motor vehicle according to claim 4, wherein the skin material layer is a needle punch non woven fabric.

10. The sunshade of a sunroof for a motor vehicle according to claim 4, wherein the skin material layer is a plastic foam laminate knit fabric.

11. The sunshade of a sunroof for a motor vehicle according to claim 4, wherein the skin material layer is superposed on the surface of one of the resin impregnated glass fiber mat layers via an adhesive film layer.

12. The sunshade of a sunroof for a motor vehicle according to claim 11, wherein the back material layer is superposed on the surface of the other resin impregnated glass fiber mat layer via another adhesive film layer.

13. The sunshade of a sunroof for a motor vehicle according to claim 4, further including press molds to fusion bond the layers.

14. The sunshade of a sunroof for a motor vehicle according to claim 13, wherein the skin material layers is set on top, clamped, heated and pressurized.

15. The method of manufacturing a sunshade of a sunroof for a vehicle according to claim 2, further comprising making a compressibility high in both side edges of the sunshade by the press mold, and forming a support portion expanding and protruding to the skin material layer and the back material layer in a part of both side edges by making the compressibility low.

16. The sunshade of a sunroof for a motor vehicle according to claim 1, further comprising pressurizing a front edge of the sunshade with a high compressibility.

17. The sunshade of a sunroof for a motor vehicle according to claim 16, further comprising making the front edge of the sunshade rigid by increasing the compressibility.

18. The sunshade of a sunroof for a motor vehicle according to claim 1, further comprising structuring side edges of the sunshade to form support portions.

19. The sunshade of a sunroof for a motor vehicle according to claim 1, further comprising forming an engagement portion in a rear edge of the sunshade.

20. The sunshade of a sunroof for a motor vehicle according to claim 19, further comprising forming the engagement portion by protruding the sunshade to an upper side in a curved shape.

* * * * *

(12) EX PARTE REEXAMINATION CERTIFICATE (7380th)
United States Patent
Ito et al.

(10) Number: US 6,706,370 C1
(45) Certificate Issued: Feb. 23, 2010

(54) SUNSHADE OF A SUNROOF FOR A MOTOR VEHICLE AND MANUFACTURING METHOD THEREOF

(75) Inventors: Tatsuro Ito, Kasugai (JP); Shogo Okado, Kasugai (JP); Kazuo Sugiura, Kasugai (JP); Takashi Mihara, Kasugai (JP); Fumihiro Funahashi, Kasugai (JP)

(73) Assignee: Howa Textile Industry Co., Ltd., Kasugai, Aichi Pref. (JP)

Reexamination Request:
No. 90/009,151, May 16, 2008

Reexamination Certificate for:
Patent No.: 6,706,370
Issued: Mar. 16, 2004
Appl. No.: 10/300,732
Filed: Nov. 19, 2002

(51) Int. Cl.
*B29C 43/20* (2006.01)
*B32B 3/02* (2006.01)
*B32B 27/12* (2006.01)
*B32B 27/40* (2006.01)
*B32B 5/18* (2006.01)

(52) U.S. Cl. .................. 428/174; 156/213; 156/285; 156/300; 160/370.21; 264/241; 264/257; 264/325; 264/511; 296/97.6; 296/97.7; 428/172; 428/192; 428/318.4; 428/99

(58) Field of Classification Search .................. None
See application file for complete search history.

(56) References Cited

FOREIGN PATENT DOCUMENTS

| JP | 03227210 | 10/1991 |
|---|---|---|
| JP | 04036907 | 8/1992 |
| JP | 05200930 | 8/1993 |
| JP | 05228945 | 9/1993 |
| JP | 07001636 | 1/1995 |
| JP | 09039142 | 2/1997 |
| JP | 09309120 | 12/1997 |
| JP | 10000716 | 1/1998 |
| JP | 10052901 | 2/1998 |

*Primary Examiner*—Jerry D. Johnson

(57) ABSTRACT

A sunshade of a sunroof for a motor vehicle includes superposing resin impregnated glass fiber mat layers (2,3) on both surfaces of a semi-rigid layer (1) made of an urethane foam and having a uniform thickness, superposing a skin material layer (5) on a surface of one of the resin impregnated glass fiber mat layers (2) via an adhesive film layer (4), superposing a back material layer (7) on the surface of the other resin impregnated glass fiber mat layer (3) via an adhesive film layer (6), and fusion bonding the layers by clamping the layers (8) by a press mold (9, 10) and heating and pressurizing the layers (8) so as to form a predetermined three-dimensional shape.

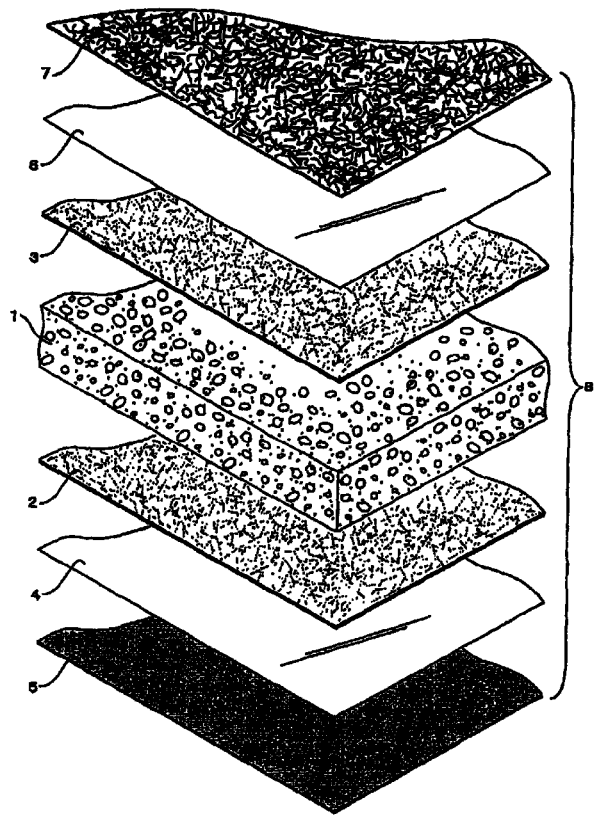

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3–18 are cancelled.

Claims 1, 2, 19 and 20 are determined to be patentable as amended.

1. A method of manufacturing a sunshade of a sunroof for a motor vehicle comprising:
    superposing resin impregnated glass fiber mat layers on both surfaces of a semi-rigid layer made of an urethane foam and having a uniform thickness;
    superposing a skin material layer on a surface of one resin impregnated glass fiber mat layer;
    superposing a back material layer on a surface of the other resin impregnated glass fiber mat layer; and
    fusion bonding the layers by clamping the layers by a press mold and heating and pressurizing the layers so as to form a predetermined three-dimensional shape, *the sunshade comprising first and second oppositely disposed side edges and a central portion disposed therebetween,*
    *wherein said first and second side edges are more rigid than the central portion due to the increased compressiblity of said first and second side edges versus the compressibility of the central portion, and wherein said press mold also forms first and second support portions disposed at the same ends of said first and second side edges, respectively, wherein said first and second support portions have a lower compressibility than portions of said first and second side edges except the same ends of said first and second side edges.*

2. The method of manufacturing a sunshade of a sunroof for a motor vehicle according to claim 1, further comprising providing a split mold laterally sliding with the press mold, and fusion bonding by involving the skin material layer forming a front edge of the sunshade in a back side by the split mold, *and wherein said front edge is disposed between said first and second side edges and adjacent to said central portion, and wherein said front edge is more rigid and exhibits a higher compressibility than said central portion and is involved at a portion of the skin material layer corresponding thereto in said back side.*

19. The *method of manufacturing a* sunshade of a sunroof for a motor vehicle according to claim 1, further comprising forming an engagement portion in a rear edge of the sunshade.

20. The *method of manufacturing a* sunshade of a sunroof for a motor vehicle according to claim 19, further comprising forming the engagement portion by protruding the sunshade to an upper side in a curved shape.

* * * * *